United States Patent [19]
Shuster

[11] Patent Number: 5,427,873
[45] Date of Patent: Jun. 27, 1995

[54] LITHIUM-WATER BATTERY

[75] Inventor: Nicholas Shuster, Madison, Ohio

[73] Assignee: Westinghouse Electric Corporation, Pittsburgh, Pa.

[21] Appl. No.: 583,061

[22] Filed: Sep. 14, 1990

[51] Int. Cl.⁶ .............................................. H01M 6/04
[52] U.S. Cl. ................................. 429/188; 429/70; 429/74
[58] Field of Search ........................... 429/68–70, 429/188, 74

[56] References Cited

U.S. PATENT DOCUMENTS

| | | | |
|---|---|---|---|
| 3,730,776 | 5/1973 | Geisler | 136/100 R |
| 3,791,871 | 2/1974 | Rowley | 136/100 R |
| 3,976,509 | 8/1976 | Tsai et al. | 136/154 |
| 4,001,043 | 1/1977 | Momyer | 429/206 |
| 4,007,057 | 2/1977 | Littauer et al. | 429/57 |
| 4,035,554 | 7/1977 | Halberstadt et al. | 429/80 |
| 4,053,685 | 10/1977 | Rowley et al. | 429/68 |
| 4,057,675 | 11/1977 | Halberstadt et al. | 429/39 |
| 4,188,462 | 2/1980 | Klootwyk | 429/68 |
| 4,189,528 | 2/1980 | Klootwyk | 429/70 |
| 4,200,685 | 4/1980 | Klootwyk et al. | 429/70 |
| 4,269,907 | 5/1981 | Momyer et al. | 429/67 |
| 4,360,577 | 10/1978 | Klootwyk | 429/209 |
| 4,481,266 | 11/1984 | Littauer et al. | 429/12 |
| 4,500,613 | 2/1985 | Galbraith | 429/69 |
| 4,514,474 | 4/1985 | Momyer et al. | 429/27 |
| 4,528,248 | 7/1985 | Galbraith | 429/8 |
| 4,528,249 | 7/1985 | Galbraith | 429/15 |
| 4,709,882 | 12/1987 | Galbraith | 244/53 R |

Primary Examiner—Peter A. Nelson

[57] ABSTRACT

A lithium-water battery provides reliable power for long durations in the ocean at temperatures down to 0° C. and pressures up to 680 atmospheres (10,000 psi) without the need for mechanical pumps or valves to admit reactant water from the ocean into the battery or to maintain a circulating electrolytic solution in the battery. The battery has a natural circulation, alkaline, aqueous electrolyte contained in the housing with a lithium anode and a cathode disposed in the electrolytic solution. A hydrophilic cation exchange membrane attached to the housing is disposed between the electrolytic solution and the ocean environment surrounding the battery for retaining the hydroxyl ions in the alkaline electrolytic solution while admitting water into the solution from the environment.

Advantageously, a low power lithium-water battery can provide several watts at about 1.4–1.5 volts for up to a year or more anywhere in the ocean.

30 Claims, 5 Drawing Sheets

LITHIUM-WATER BATTERY

This invention described herein was made under U.S. Office of Naval Technology Contract N00014-88-C-2011.

BACKGROUND OF THE INVENTION

The invention relates to a lithium-water battery for providing reliable power for long durations of time in an aqueous environment, and particularly in the ocean, which serves as a reactant water source. It is particularly useful in low discharge rate applications of about 100 mA/cm² (anode area) or less.

Magnesium-water batteries are presently the preferred autonomous undersea power sources for use in low rate, long duration applications. A magnesium-water electrochemical system has a high theoretical specific energy of about 5200 watt-hours/kilogram of magnesium. Also, reactant water need not be prepackaged in the battery because water is freely available from the aqueous environment. Thus magnesium-water batteries have a high energy/weight ratio.

Certain magnesium-water batteries have proven to be unreliable in deep ocean environments. It was found that the magnesium-water electrochemical reaction requires the presence of dissolved oxygen to depolarize the cathode. Thus the performance of these batteries begins to deteriorate where the dissolved oxygen content of the water is less than about 2.0 ml O₂/liter. Their performance drastically declines where the dissolved oxygen content of the water is less than about 0.5 ml O₂/liter. Silver chloride may be employed in magnesium batteries as the cathodic reactant, but this requires that the silver chloride be prepackaged and carried by the battery. Thus a magnesium-silver chloride battery incurs a substantial weight penalty which penalizes its specific energy (energy/battery weight ratio). However, a battery containing an anode of magnesium or a similar non-reactive metal and an oxidizer such as silver chloride or the like is stable and relatively safe to handle.

The unreliability of magnesium-water batteries in deep ocean low power environments has created a specific need for an all-ocean battery based on another technology which is capable of providing several watts at more than about 0.75 volts for a minimum duration of one year. Such a battery must reliably provide stable power at ocean depths of up to 6000 meters (20,000 feet) and at temperatures down to 0° C., where the oxygen content of the ocean may be less than about 0.5 ml O₂/liter. Importantly, a long duration, low power battery system must be lightweight so that it may be readily handled. This limitation on weight requires that a low power battery system have a practical specific energy of at least about 770 watt-hour per kilogram of battery weight.

It has been proposed to employ a low rate battery based on a lithium-thionyl chloride electrochemical system to replace the magnesium-water batteries. However the best low rate lithium-thionyl chloride systems only provide a system specific energy about 450 watt-hours/kilogram. Thus these systems fall short of the 770 Wh/kg limitation. In addition, lithium and thionyl chloride are highly reactive. Thus batteries based on these systems must be carefully stored and handled.

A lithium-water battery system would be a logical replacement for the magnesium-water system if water were not so corrosive toward lithium. The highly exothermic (−53.3 kcal/gm-mole lithium) corrosion reaction proceeds in accordance with the following equation:

Anode: Li+H₂O→LiOH+½H₂.

The open circuit corrosion current density of this corrosion reaction in seawater at 0° C. and ambient pressure is about 19,500 mA/cm², which will approximately double for each ten degree centigrade temperature rise. Further, corrosion losses tend to accelerate with time due to the resultant nonuniform lithium surface morphology. This generally results in premature loss of performance and premature end of life before the lithium is fully utilized. The electrochemical reaction, which generates useful energy, proceeds in accordance with the following equations:

Anode: Li→Li⁺+electron

Cathode: H₂O+electron→OH⁻+½H₂

Overall: Li+H₂O→LiOH+½H₂

A present high power lithium-water battery system, which has been demonstrated to be useful in short duration high power applications, discharges at a current density of 800–1000 mA/cm² of lithium surface. This system achieves lithium utilization rates of over 80%. The lithium hydroxide may then precipitate as a monohydrate crystal if the lithium hydroxide solution concentration is allowed to reach saturation.

The present short duration, high power, lithium-water battery system controls corrosion of the lithium anode by circulating a 4–5 molar LiOH electrolyte solution to maintain a suitably porous oxide film on the surface of the anode. At concentrations less than about 4M LiOH, the corrosion rate becomes excessive. At concentrations above 5M LiOH, which is near the saturation point, the performance of the battery system is unacceptable. In addition, the LiOH electrolyte solution can contain about 5%–20% by volume methanol. It is theorized that the thermodynamic activity of water is reduced via hydrogen bonding with methanol to a point where the water will not aggressively attack the lithium anode. The composition of the electrolyte solution is maintained by a mechanical pump which introduces make-up water from the aqueous environment into the battery system to replace the reacted water. The mechanical pump also circulates the electrolyte solution through the system and bleeds a small amount of electrolyte solution from the system back to the aqueous environment in order to maintain the lithium hydroxide concentration below the saturation point of the electrolyte solution. The anodic reactions are so sensitive to the flow rate of the electrolyte solution, that the voltage may be controlled by the pumping rate.

The present short term, high power, lithium-water battery system has been demonstrated to be useful for durations of less than one hour. However, this battery system is probably not practical for durations of more than a few days because of the questionable ability of a mechanical pump to reliably operate for long durations without any maintenance. This is a particular concern in an all-ocean battery system which must reliably operate at ocean depths of down to about 6000 meters (20,000 feet) and at temperatures of down to about 0° C. However, if a mechanical pump is not employed, then natural convection must be employed to circulate the electrolyte solution in order to maintain a suitably porous dynamic film on the lithium anode. Also there must be a means for introducing make-up water into the battery system to replace the water which reacts with the lithium and the lithium hydroxide.

A practical long duration, low power, lithium-water battery system will have a low electrochemical current density of less than about 100 mA/cm$^2$ of anode surface. Thus a suitably porous dynamic film must be carefully maintained on the anode to control corrosion without passivating the anode. Further a lightweight battery system must have a lithium utilization rate of at least about 25% in order to realize an overall specific energy of 770 Wh/kg or more based on the total system weight.

SUMMARY OF THE INVENTION

It is an object of the present invention to provide a lithium-water battery system which will reliably operate in an aqueous environment such as the ocean for several days or more. It is a further object to provide a long duration lithium-water battery system which does not employ a mechanical pump to introduce water from the aqueous environment into the battery system and to circulate the electrolyte solution.

It is also an object of the present invention to provide a long duration lithium-water battery which will reliably operate anywhere in the ocean and particularly on the floor of the ocean, which may be at a depth of about 6,000 meters (20,000 feet) and a temperature of about 0° C.

It is also an object of the present invention to provide a long duration lithium battery which will reliably operate at low electrochemical current densities of less than about 100 mA/cm$^2$. Another object of the present invention is to provide a low discharge rate battery system which has a specific energy of at least 1000 watt-hour per kilogram of lithium and preferably about 2000 Wh/kg lithium or more. Still another object is to provide a long duration battery which discharges at rates of less than about 100 mA/cm$^2$ and utilizes at least 30% of the lithium in the electrochemical reaction.

With these objects in view the present invention resides in a lithium-water battery having a lithium anode and a cathode disposed in a naturally circulating alkaline aqueous electrolyte solution. A housing contains the electrolyte solution. A hydrophilic cation exchange membrane is attached to the housing and disposed between the electrolyte solution and the aqueous environment (which may be ambient seawater or fresh water) for retaining hydroxyl ions in the electrolyte solution while admitting water into the electrolyte solution from the environment to maintain proper alkalinity and to provide the proper quantity of water necessary to sustain the power output. The concentration differences between the electrolyte solution in the battery and any normal aqueous environment such as the ocean or fresh water are sufficient to thermodynamically pump water into the battery. Advantageously a mechanical pump is not needed to introduce makeup water or to circulate the electrolyte solution.

In a preferred embodiment of the present invention, the electrolyte solution comprises lithium hydroxide as an electrolyte. The solution in this embodiment may be closely controlled near its saturation level because lithium hydroxide is being continuously generated while no more than a minor amount of lithium hydroxide diffuses through the cation exchange membrane into the environment and excess lithium hydroxide precipitates as a monohydrate. More preferably, the solution comprises a co-electrolyte such as potassium hydroxide to further increase the alkalinity of the solution in order to moderate the anodic reaction and to control the corrosion.

In another preferred embodiment of the invention, the electrolyte comprises a lithium hydroxide electrolyte and a potassium hydroxide co-electrolyte together with methanol. In other preferred embodiments of the present invention, carbohydrates (such as sucrose) or other high molecular weight organic molecules having a high hydrogen bonding capability are employed in place of methanol. Such organic compounds reduce the activity of the water and thereby to reduce the corrosion of the lithium anode. Also, the high molecular weight organic compounds such as sucrose are bulky and therefore are more effectively retained than is methanol by the cation exchange membrane.

In a preferred configuration, a battery embodying the present invention has an anode with a substantially flat reactive surface. A particular configuration employs a cathode which is movably supported on the anode surface to maintain the distance between the cathode and the anode while the battery is operating.

In another preferred configuration, a battery embodying the present invention has an anode and a cathode disposed in spaced apart concentric relation. In a particular configuration, the anode is disposed outwardly of the cathode so that the area of the anode increases as the anode is consumed and the distance between the anode and the cathode increases. In this particular configuration, the increasing internal voltage drop due to the increasing distance between the anode being consumed and the cathode is at least partially offset by the drop in polarization losses due to lower current densities at the anode surface. Thus a change of up to about five centimeters (2 inches) or more between the anode and the cathode will not seriously impair the operation of the battery. Also, the reduction of the anodic current density with a concomitant reduction of polarization with time tends to prevent passivation and thereby stabilize the performance of a battery.

It is also preferred to configure the battery such that the cation exchange membrane is disposed in an annulus. In this configuration, the membrane is protected from damage by animals, rocks and the like. Also, some of the hydroxyl ions which migrate through the membrane will tend to remain in the annulus and retard the migration of additional ions. Further, caustic conditions in the annulus will retard the growth of organisms on the membrane.

DESCRIPTION OF THE DRAWINGS

The invention will become more readily apparent from the following description of preferred embodiments thereof shown by way of example only, in the accompanying drawings, wherein.

DESCRIPTION OF THE PREFERRED EMBODIMENTS

Figure 1:
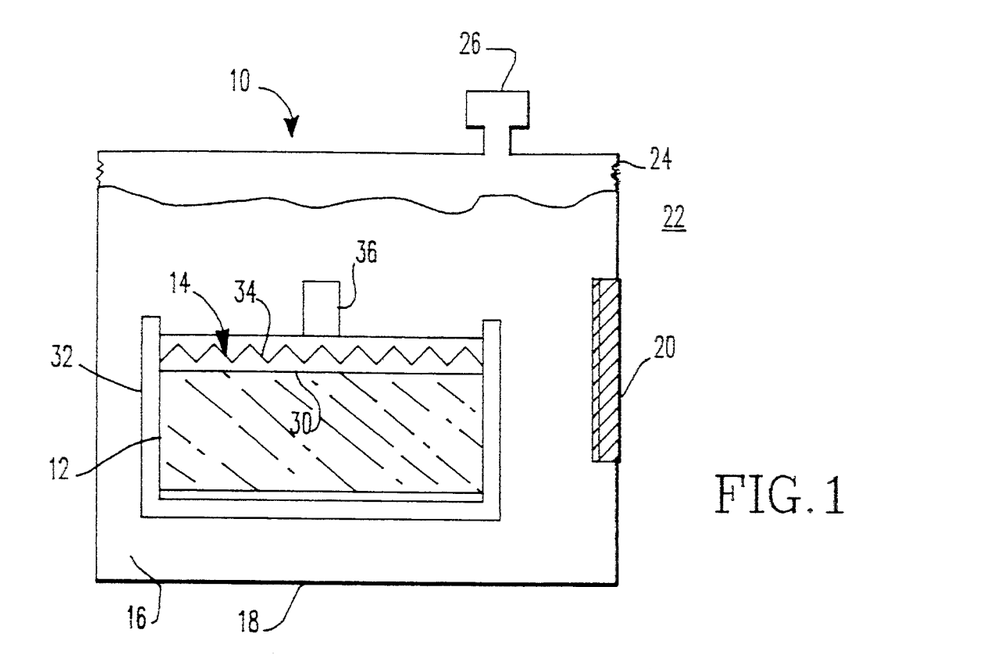
FIG. 1 is a schematic representation of a battery embodying the present invention wherein an anode has a surface supporting a cathode.

FIG. 1 generally illustrates a battery 10 having an anode 12 and a cathode 14 disposed in an alkaline aqueous electrolyte solution 16. The solution 16 is generally contained by a housing 18 to which is attached one or more hydrophilic cation exchange membranes 20 for retaining hydroxyl ions in the solution 16 while admitting water into the solution 16 from an aqueous environment 22, which may be seawater or fresh water. For purposes of convenience, the following description will describe the invention in the context of a long duration all-ocean battery which is operable to depths of down to 6000 meters (20,000 feet) and temperatures of 0° C.

As is shown in FIG. 1, the battery 10 may have a bellows 24 for providing volumetric compensation due to instantaneous differences in water consumption and water admission. Such a bellows 24 may be neoprene or other suitable flexible material. A flexible bellows also acts as a simple yet effective means for transmitting pressure to equalize pressures between the inside and outside environments. In addition, the battery 10 may have a differential pressure valve 26 for venting hydrogen gas generated by the electrochemical reaction at the cathode 14 and the corrosion reaction at the anode 12. The bellows 24 and the vent valve 26 are particularly designed to protect excessive differential pressures which may cause mechanical damage and/or rupture of the cation exchange membrane 20.

The anode 12 is preferably metallic lithium but may also be a lithium alloy, e.g., such as a lithium-aluminum alloy like the alloy disclosed by U.S. Pat. No. 3,980,498, which is hereby incorporated by reference. The anode 12 of FIG. 1 has a reactive surface 30 in contact with the electrolyte solution 16. The other surfaces of the anode 12 are rendered non-reactive by a non-conducting coating 32 of polyurethane, an epoxy or other suitable material. A conventional current collector (not shown) made of copper or other conductive material may be embedded in or bonded to the lithium anode for conducting the current to a load (not shown).

The cathode 14 preferably comprises a nickel mesh 34 or other material having a low hydrogen over-potential. The cathode 14 of FIG. 1 rests directly on the reactive-surface 30 of the anode 12. A weight 36 urges the cathode 14 against the anode surface 30 so that the cathode 14 remains in contact with the anode 12 as it is consumed. Alternatively, a spring (not shown) may be employed to urge the cathode 14 toward the anode 12.

A porous oxide film on the anode surface 30 prevents a short between the anode 12 and the cathode 14. The cathode 14 may, if desired, be spaced from the anode surface 30 by, e.g., 5 mm (0.125 inch) standoffs (not shown). The cathode 14 is operatively connected to a load by a suitable current conductor (not shown).

The electrolyte solution 16 is made highly alkaline in order to maintain an effective porous film on the lithium anode and thereby obtain a stable discharge rate and an acceptable corrosion rate. Thus, the solution 16 contains high concentrations of lithium hydroxide and, in the case of batteries having low discharge rates of below about 10 mA/cm$^2$ another electrolyte such as potassium hydroxide or other hydroxide to reduce the porosity of the film.

A series of laboratory breaker tests was conducted on lithium anodes in quiescent alkaline electrolyte solutions at about 0° C. and ambient pressure to determine the operating characteristics of batteries employing similar solutions under similar conditions. A test on an anode in a 5 molar lithium hydroxide seawater solution at 3° C. indicated that a similar battery operating at a 75 mA/cm$^2$ discharge rate will be subject to a 40 mA/cm$^2$ corrosion rate. Similar tests on lithium anodes in 5 molar lithium hydroxide (about 10% by weight) seawater solutions containing 35% and 45% by weight potassium hydroxide indicated that similar batteries operating at a 2 mA/cm$^2$ discharge rate will be subject to corrosion rates of 9 mA/cm$^2$ and 2 mA/cm$^2$ respectively.

Figure 3:
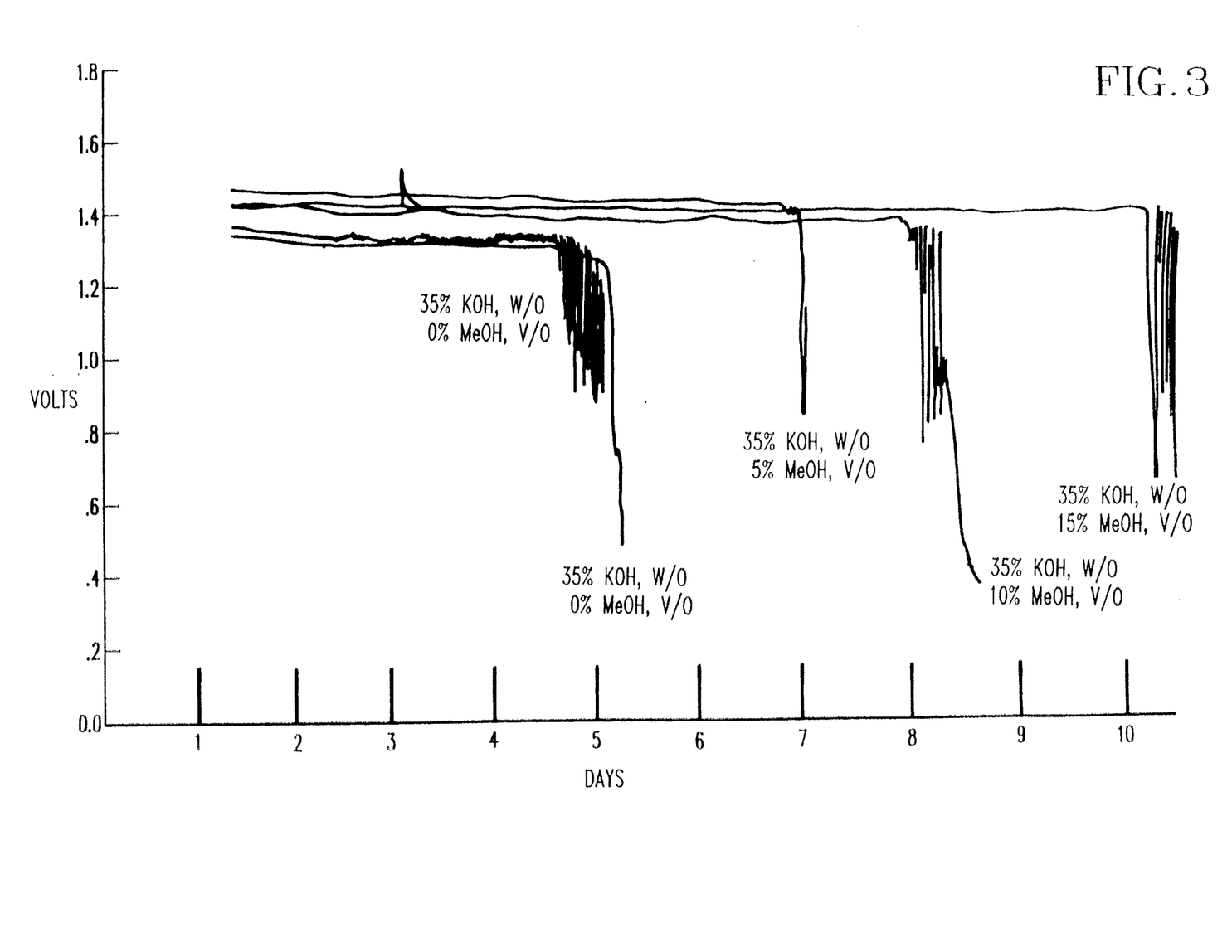
FIG. 3 shows the output of lithium-water systems comprising highly caustic electrolyte solutions containing methanol.

Preferably, the alkaline electrolyte solution 16 contains methanol. Laboratory breaker tests on lithium anodes in saturated lithium hydroxide seawater solutions further containing 35% by weight potassium hydroxide (in the control solution) and additionally 5%, 10% and 15% by volume (about 3.5%, 7.0% and 10.5% by weight respectively) methanol (in the test solutions) at 0° C. and atmospheric pressure indicate that similar batteries containing methanol and discharging at 2.0 mA/cm$^2$ of reactive anode surface area will discharge at higher voltages and last longer than will batteries not containing methanol. FIG. 3 presents the results of these tests. Additionally, the 5%, 10% and 15% by volume methanol tests indicated a lithium utilization of more than 23% 32% and 35% respectively whereas the 0% methanol (control) test indicated a lithium utilization of less than 19%. Also, these methanol tests indicated specific energies of more than 1.3, 1.7 and 1.9 kWh/kg of lithium respectively whereas the 0% methanol test indicated a specific energy capacity of almost 1.0 kWh/kg.

More preferably, the alkaline electrolyte solution contains a large bulky organic compound having a high hydrogen bonding capability in place of methanol. Organic compounds including such carbohydrates as sugars, starches and celluloses and the like may be effectively employed for this purpose. Thus, for example, sucrose (molecular weight=342; 40% OH$^-$), sorbitol (molecular weight=182; 56% OH$^-$), L-sorbose (molecular weight=180; 47% OH$^-$) and like compounds, may be substituted for methanol on the basis of equivalent OH$^-$ content.

Figure 4:
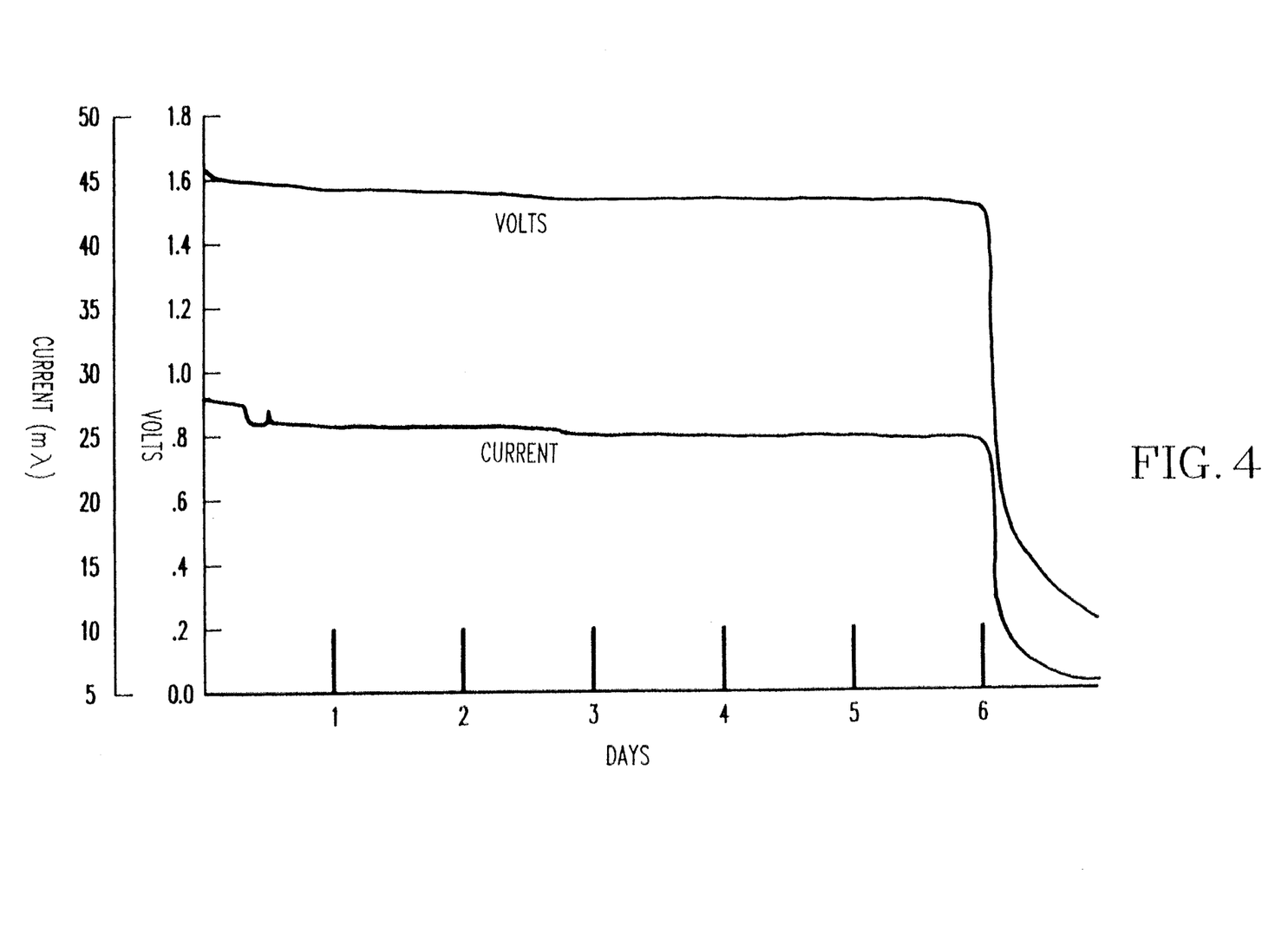
FIG. 4 shows the output of a lithium-water system comprising a highly caustic electrolyte solution containing sucrose in place of methanol.

Additional laboratory beaker tests on lithium anodes in 35% and 41% potassium hydroxide solutions saturated with lithium hydroxide and discharged at 2.0 mA/cm$^2$ indicated that 120 grams/liter (about 10% by weight or about 7.5 volume %) sucrose is as effective as methanol in reducing corrosion. FIG. 4 presents the results of the breaker tests which employed 35% potassium hydroxide. Large, bulky organic compounds are preferred over methanol because they are less likely to diffuse through the membranes and be lost. Also, compounds such as sugar will not swell common materials of construction which may be employed in the bellows 24.

Figure 5:
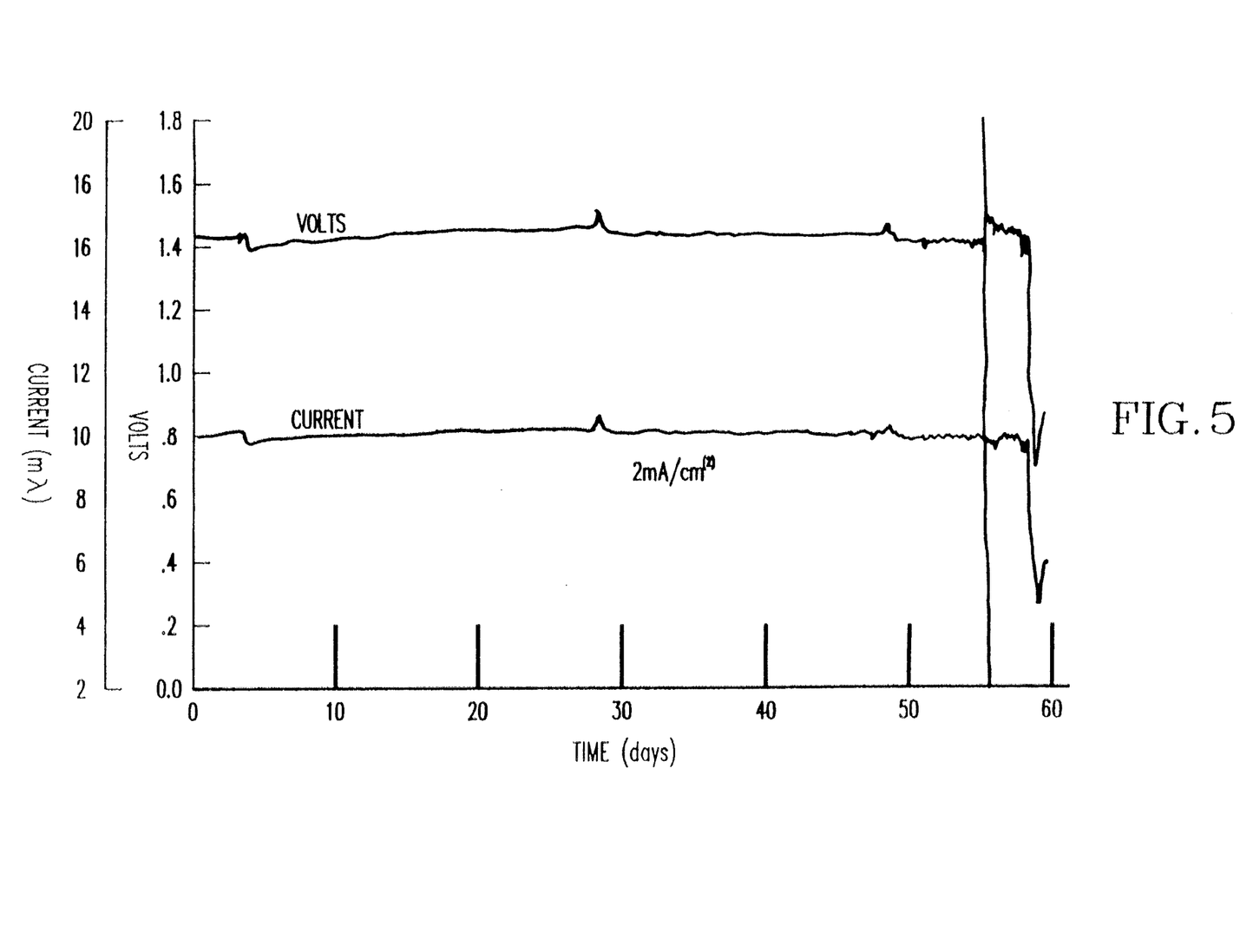
FIG. 5 shows the output of a lithium-water system compressing a highly caustic electrolyte solution at ambient pressure and 0° C.

In a long duration laboratory beaker test in the series of ambient pressure tests, a lithium anode in a 41% by weight potassium hydroxide solution saturated with lithium hydroxide and containing 5% by volume methanol at 0° C. and ambient pressure was discharged at 2.0 mA/cm$^2$ for 56 days. This test indicated that a similar battery will be very stable and will operate at about 1.4 volts. FIG. 5 presents the results of this test.

Figure 6:
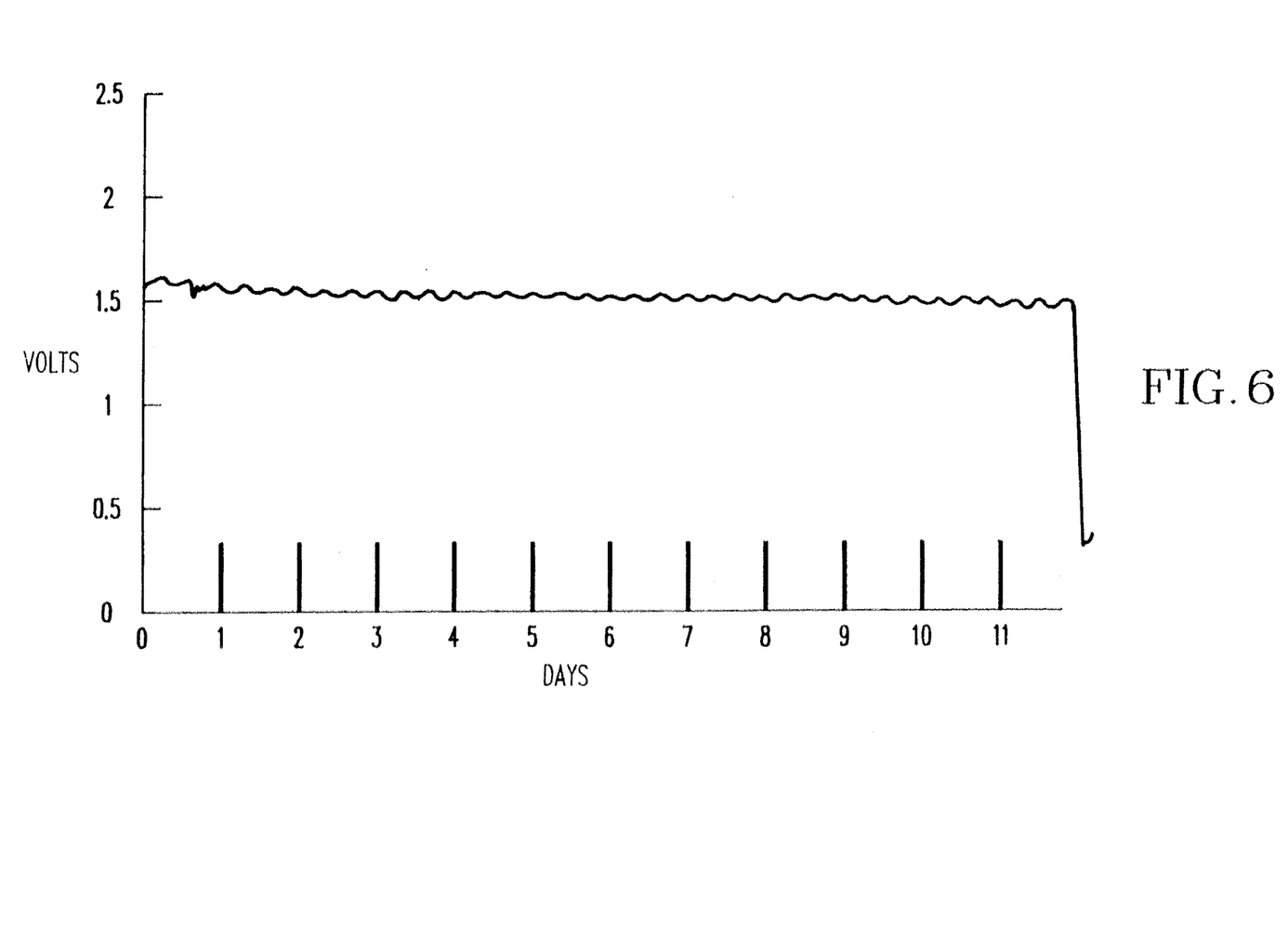
FIG. 6 shows the output of a lithium-water system comprising a highly caustic electrolyte solution at 680 atmospheres pressure and 0° C.

A series of high pressure laboratory beaker tests were conducted on lithium anodes in quiescent electrolyte solutions at 0° C. and at 680 atmospheres (10,000 psi) in order to determine the characteristics of lithium water batteries at great ocean depths. The high pressure tests generally indicated that for any given electrolyte composition tested at ambient pressure, similar utilizations will be obtained at higher pressure but at reduced current densities. A test employing a 38% by weight potassium hydroxide solution saturated with lithium hydroxide and containing 5% by volume (about 3.5% by weight) methanol indicated that batteries with similar electrolyte solutions would reliably operate at a discharge rate of 0.5–1.0 mA/cm$^2$ for long durations. A test employing a 5 molar lithium hydroxide solution without a co-electrolyte indicated that batteries with similar electrolytic solutions would reliably operate at a discharge rate of 2.0 mA/cm$^2$ but with relatively high corrosion losses. However, batteries employing similar solutions could be usefully discharged at higher rates than 2.0 mA/cm2 with lower corrosion losses. A test employing a 5 molar lithium hydroxide solution containing 5% by volume methanol indicated that batteries with similar electrolytic solutions would reliably operate at a discharge rate of 1.0 mA/cm$^2$ at ocean depths for long durations. FIG. 6 presents the results of this test. The oscillations on FIG. 6 reflect temperature fluctuations permitted by the temperature controller.

The above described tests generally show that lithium-water electrochemical systems can be stably discharged for long durations at less than about 100 mA/cm$^2$ at the anodes in quiescent seawater at about 0° C. and at any pressure with acceptable corrosion current densities.

The housing 18 may be constructed of any suitable nonporous structural material such as a stainless steel. The housing 18 may alternatively be a lighter weight plastic or composite material such as fiber glass reinforced polyester in a light weight battery. The cation exchange membrane 20 effectively forms an open window in the housing 18 between the electrolyte solution 16 and the aqueous environment 22.

A suitable cation ion exchange membrane 20 must retain the hydroxyl ions in the electrolytic solution 16 while admitting sufficient water from the environment 22 to balance the water consumption within the electrolyte solution 16 due to the cathodic reaction and to corrosion reactions as well as the precipitation of lithium hydroxide as a monohydrate salt. In addition, at high pressures, dissolved hydrogen may diffuse through the membrane 20. A commercial asymmetric cation exchange membrane marketed as du Pont NAFION 90209 has been demonstrated to be an effective membrane at pressures up to 680 atmospheres (10,000 psi). This membrane is a perfluorinated polymer which derives its cation exchange and hydrophilic properties from pendent carboxylic and sulfonic acid groups which are attached to the polymer backbone. The negatively charged carboxylic and sulfonic acid groups tend to repel the hydroxyl ions present in the electrolyte solution with little leakage. Because the carboxylic and sulfonic acid groups are polar by nature, they tend to attract water and permit diffusion of the water and positive ions. A water flux rate of about 0.05–0.20 ml/cm$^2$/day (0.5–1 ml/inch$^2$/day) is typical for water diffusing from seawater into an electrolyte solution of 35% KOH saturated with LiOH. The difference between the water consumption rate and water diffusion rate may be met by the bellows 24.

Figure 2:
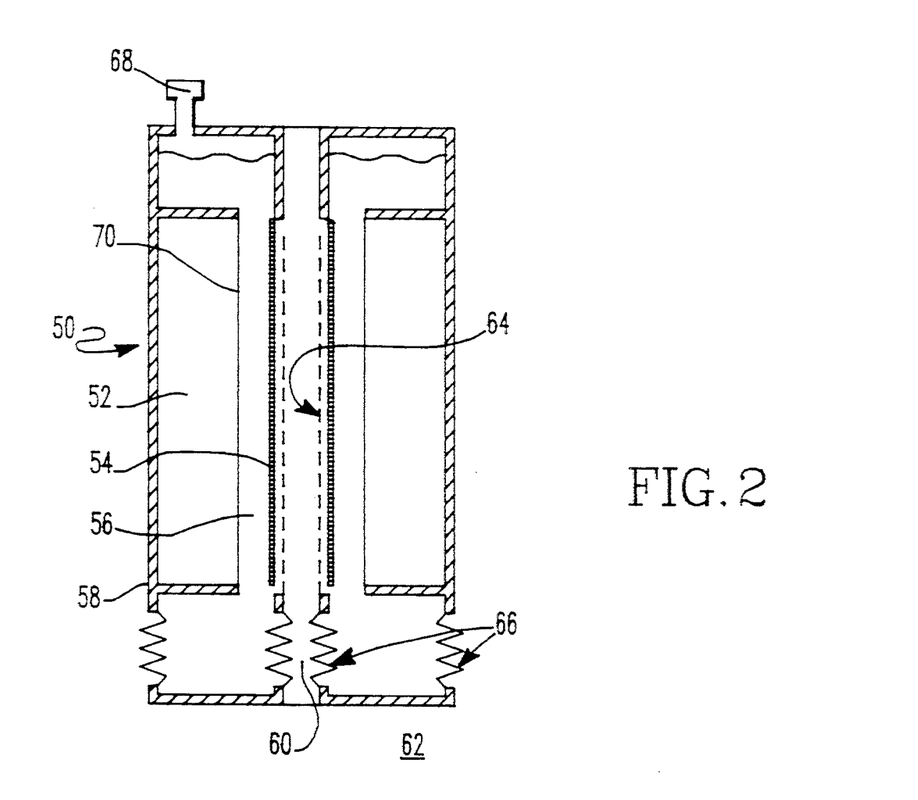
FIG. 2 is a schematic representation of a second embodiment of the present invention wherein a battery has an anode and a cathode disposed in spaced apart concentric relation.

FIG. 2 generally illustrates a second embodiment of the present invention wherein a battery 50 has a concentric anode 52 and a cathode 54 disposed in an alkaline aqueous solution 56. The solution 56 is generally contained in a donut shaped housing 58 having an annulus 60 through which water in the aqueous environment 62 may freely flow. A cation ion exchange member 64 such as the previously described perfluorinated membrane containing carboxylic and sulfonic acid groups or other suitable materials is attached to the housing 58 for retaining hydroxyl ions in the electrolyte solution 56 while admitting water in the annulus 60 into the solution 56. The battery housing 58 and the cation exchange member 64 are protected from excessive pressure differentials by a bellows 66 and a differential pressure vent valve 68. The electrolytic solution 56 preferably contains lithium hydroxide and optionally a co-electrolyte such as potassium hydroxide and an organic compound having hydrogen bonding capacity as is described above.

The battery 50 of FIG. 2 preferably is oriented such that the reactive surface 70 of the anode 52 remains vertical. Advantageously natural circulation of the electrolyte solution tends to promote uniform reactions at the anode and gravity tends to remove precipitates such as lithium hydroxide monohydrate away from the film surface.

The batteries 10 and 50 of FIGS. 1 and 2 respectively will reliably operate anywhere in the ocean for long durations without forced circulation of the electrolyte solution by mechanical pumps and without the need for mechanical pumps to pump reactant water from the aqueous environment into the electrolyte solution in the battery. Such batteries are particularly useful in low power applications. For example, a low power lithium-water battery for providing about 2 watts of power for a duration of at least a year (17,520 watt-hours) at an ocean temperature of 0° C. and pressure of from about 17 atmospheres (250 psi) up to about 600 atmospheres (8700 psi), which is the equivalent of 6000 meters (20,000 feet) water depth, would stably operate at about 1.4–1.5 volts and at an anode current density of up to about 1.0 mA/cm$^2$.

The previously described laboratory breaker tests indicated that similar lithium-water batteries comprising highly caustic electrolyte solutions containing 5% to 15% by volume methanol will utilize from 23% to 35% of the lithium anode and will have specific energies of from 1.3 to 1.9 kWh/kg lithium anode. Thus a 2 watt-year battery system embodying the present invention may have a lithium anode weighing about 13.5 kg to 9.2 kg. A lightweight battery will only weigh about 22 kg (50 pounds) because the total weight of an optimized battery will be no more than about twice the weight of the anode where reinforced fiberglass housings and other lightweight materials are employed. The electrolytic solution would preferably be a 5 molar (saturated) lithium hydroxide containing about 5% by volume sucrose or the like. The loss of sucrose or a similar bulky molecule will be less than about a tenth the loss of methanol through the membrane.

A horizontally oriented 2 watt-year battery such as battery 10 of FIG. 1 would employ a cation exchange membrane having a cross sectional area of about 900 cm$^2$(140 square inches) to accommodate the changing physical conditions. A vertically oriented 2 watt-year battery such as the battery 50 of FIG. 2 would employ a slightly larger membrane having a cross sectional area of about 1100 cm$^2$ (170 square inches). The same low power battery would stably operate at about 2.0 mA/cm$^2$ at pressures of less than about 17 atmospheres (250 psi) where the hydrogen which is generated as a byproduct of the anode corrosion reaction would bubble from the anode surface and thereby advantageously induce natural convention, which supports higher current density operation of the battery.

While certain presently preferred embodiments of the invention have been described and illustrated, it is to be distinctly understood that the invention is not limited thereto but may be otherwise variously embodied within the scope of the following claims:

What is claimed is:

1. A lithium-water battery for operating in an aqueous environment; comprising:
   a housing;
   a natural circulation, alkaline, aqueous electrolyte solution contained in the housing;
   a lithium anode and a cathode disposed in the electrolyte solution; and
   a hydrophilic cation exchange membrane attached to the housing and disposed between the electrolyte solution and the environment around the battery for retaining hydroxyl ions in the electrolyte solution while admitting water into the electrolyte solution from the environment.

2. The battery of claim 1, wherein the electrolyte solution comprises lithium hydroxide as an electrolyte.

3. The battery of claim 2, wherein the electrolyte solution comprises a co-electrolyte.

4. The battery of claim 2, wherein the electrolyte solution comprises potassium hydroxide.

5. The battery of claim 4, wherein the electrolyte solution comprises about 35% to 45% (by weight) potassium hydroxide.

6. The battery of claim 2, wherein the electrolyte solution comprises methanol.

7. The battery of claim 6, wherein the electrolyte solution comprises about from 5% to 15% (by volume) methanol.

8. The battery of claim 2, wherein the electrolyte solution comprises a sugar.

9. The battery of claim 8, wherein the sugar is selected from the group consisting of sucrose, sorbitol and L-sorbose and mixtures thereof.

10. The battery of claim 9, wherein the sugar is sucrose.

11. The battery of claim 10, wherein the electrolyte solution contains about 120 grams of sucrose/liter.

12. The battery of claim 1, wherein the electrolytic solution is a 5 molar lithium hydroxide solution containing about 35%–45% (by weight) potassium hydroxide and a sugar selected from the group consisting sucrose, sorbitol, L-sorbose and mixtures thereof.

13. The battery of claim 12, wherein the sugar is sucrose.

14. The battery of claim 13, wherein the electrolyte solution contains about 120 grams sucrose/liter.

15. The battery of claim 1, wherein the electrolyte solution in the battery is at a pressure of at least 17 atmospheres and a temperature of about 0° C.

16. The battery of claim 15, wherein the electrolyte solution in the battery is at a pressure of at least about 600 atmospheres and a temperature of about 20° C.

17. The battery of claim 1, wherein the anode has a reactive surface and the cathode is movably supported on the surface of the anode.

18. The battery of claim 17 wherein the cathode abuts the surface of the anode.

19. The battery of claim 1, wherein the anode and the cathode are disposed in spaced apart concentric relation.

20. The battery of claim 1, wherein the anode is concentrically disposed outwardly of the cathode.

21. The battery of claim 1, wherein the cation exchange membrane is disposed in an annulus.

22. The battery of claim 1, wherein the aqueous electrolyte comprises about 5 molar lithium hydroxide and the battery discharges at the anode at less than about 100 mA/cm$^2$ in seawater at about 0° C. and at ambient pressure with a corrosion current density of less than about 50 mA/cm$^2$.

23. The battery of claim 1, wherein the aqueous electrolyte comprises about 5 molar lithium hydroxide and a coelectrolyte and discharges at the anode at about 2 mA/cm$^2$ in seawater at about 0° C. and at ambient pressure with a corrosion current density of less than 10 mA/cm$^2$.

24. The battery of claim 1, wherein the aqueous electrolyte comprises about 5 molar lithium hydroxide and a coelectrolyte and the battery discharges at the anode at about 2 mA/cm$^2$ in seawater at about 0° C. and at ambient pressure with a maximum corrosion current density of about 2 mA/cm$^2$.

25. The battery of claim 1, having a specific energy of at least about 1000 Wh/kg of lithium anode weight when discharging the anode at less than about 100 mA/cm$^2$ in seawater at 0° C. and at ambient pressure.

26. The battery of claim 25, wherein the battery has a specific energy of at least about 20000 Wh/kg when discharging the anode at less than about 100 mA/cm$^2$ in seawater at 0° C. and at ambient pressure.

27. The battery of claim 1, having a specific energy of at least about 1000 Wh/kg of lithium anode weight when discharging the anode at less than about 10 mA/cm$^2$ in seawater at 0° C. and at ambient pressure.

28. The battery of claim 1, having a specific energy of at least about 2000 Wh/kg when discharging the anode at less than about 10 mA/cm$^2$ in seawater at 0° C. and at ambient pressure.

29. The battery of claim 1, further including a bellows attached to the housing which compensates for instantaneous differences between the admission in water by the cation exchange membrane and the consumption of water in the battery.

30. A lithium-water battery for operating in an aqueous environment, comprising:
   a housing;
   a natural circulation, alkaline, aqueous electrolyte solution contained in the housing, the solution saturated with lithium hydroxide and containing sugar;
   a hydrophilic cation exchange membrane attached to the housing and disposed between the electrolyte solution and the environment around the battery for retaining hydroxide ions and sugar in the electrolyte solution while admitting water from the environment; and
   a bellows attached to the housing which compensates for volumetric changes due to the difference in water consumption in the battery and water admission through the cation exchange membrane.

* * * * *